United States Patent [19]

Saurer et al.

[11] Patent Number: 4,745,035

[45] Date of Patent: May 17, 1988

[54] ARTICLE HAVING A WEAR RESISTING PRECIOUS METAL COATING

[75] Inventors: Eric Saurer, Bevaix; Yves Ruedin, St-Blaise; Jean-Paul Randin, Cortaillod; Michel Sallin, Neuchâtel, all of Switzerland

[73] Assignee: Asulab S.A., Bienne, Switzerland

[21] Appl. No.: 926,065

[22] Filed: Nov. 3, 1986

[30] Foreign Application Priority Data

Nov. 4, 1985 [FR] France ............................... 85 16425

[51] Int. Cl.[4] ............................................ B32B 15/04

[52] U.S. Cl. .................................... 428/614; 428/669; 428/670; 428/672; 428/673; 428/935; 428/938

[58] Field of Search ............... 428/935, 938, 614, 669, 428/670, 672, 673, 627

[56] References Cited

U.S. PATENT DOCUMENTS

| | | | |
|---|---|---|---|
| 3,481,854 | 2/1969 | Lane | 204/192 |
| 3,606,766 | 9/1971 | Hill | 428/672 |
| 4,226,082 | 10/1980 | Nishida | 428/627 |
| 4,252,862 | 2/1981 | Nishida | 428/672 |
| 4,403,014 | 9/1983 | Bergmann | 428/672 |
| 4,517,217 | 5/1985 | Hoffman | 428/627 |
| 4,525,433 | 6/1985 | Heywood | 428/672 |

FOREIGN PATENT DOCUMENTS

| | | | |
|---|---|---|---|
| 2425210 | 7/1979 | France . | |
| 130436 | 10/1979 | Japan | 428/627 |
| 112473 | 9/1981 | Japan . | |
| 166063 | 12/1981 | Japan | 428/670 |
| 185774 | 10/1984 | Japan . | |
| 67654 | 4/1985 | Japan . | |
| 114567 | 6/1985 | Japan . | |
| 2117009 | 10/1983 | United Kingdom . | |

OTHER PUBLICATIONS

Thin Solid Films, vol. 39, pp. 165–174 (1976). Article by G. Taylor et al. "Properties of Metal Deposited Films".

*Primary Examiner*—John J. Zimmerman
*Attorney, Agent, or Firm*—Griffin, Branigan & Butler

[57] ABSTRACT

The article is provided with a coating resisting wear and corrosion, such coating being for the most part made of a precious metal or alloy of a precious metal, for example gold or an alloy containing gold.

The coating is made up of a first layer of such precious metal or alloy thereof comprising discrete inclusions of a metallic compound such as titanium nitride. These inclusions are deposited along with the precious metal in vapor phase and distributed in a substantially homogeneous manner through the entire thickness of the layer, said thickness being equal to or greater than 0.4 μm. A second layer of precious metal or alloy thereof is located between the article and said first layer.

The article may be a watch case, a bracelet link or a piece of jewelry.

4 Claims, 2 Drawing Sheets

ARTICLE HAVING A WEAR RESISTING PRECIOUS METAL COATING

This invention concerns an article such as a watch case topped by a wear resistant coating formed for the most part of a precious metal from the group including gold, silver, rhodium, palladium, platinum, iridium, osmium and ruthenium or an alloy of the foregoing, said coating being made up of a first layer of said precious metal or alloy thereof said first layer comprising discrete inclusions of a metallic compound formed by an oxide, a nitride, a carbide, a boride, a phosphide, a silicide or a fluoride, said inclusions being distributed in a substantially homogeneous manner through the entire thickness of the first layer, said first layer being applied by vapour deposition (CVD or PVD), its thickness being equal or to greater than 0.4 μm.

BACKGROUND OF THE INVENTION

Wear and corrosion resistant coatings containing precious metals, in particular gold, have already been described many times. What is sought is a product having good scratch resistance while presenting the aspect and brilliance of gold.

This is for instance the objective as defined in GB patent publication No. 2 000 812 where there has been deposited on a first lyaer of TiN, TaN, TaC, ZrN or VN a layer of noble metal or alloy either by evaporation and ionic plating (examples 1 and 2) or by an electrochemical plating followed by a thermal diffusion treatment (examples 3 and 5). It is likewise envisaged to form successively layers of Ti, TiN, a mixture of TiN and noble metal and gold or an alloy of gold. The coatings obtained in all these methods are formed of superposed layers of very different compositions deposited one after the other. Consequently, they run the risk of exhibiting lack of homogeneity or scratch resistance or resistance to thermal shocks to the interfaces between the different layers.

It has been likewise been disclosed in the same British patent publication (example 4) to form following the deposition of a layer of TiN by evaporation and ionic plating, a second layer obtained by the simultaneous evaporation from two distinct sources respectively of Ti and Cu. The preceding comments continue to apply, but furthermore it will be noted that this last procedure does not enable the obtaining of a layer of noble metal on the outer surface of the coating.

In the objective set forth in the above-mentioned document, the superficial gold layer must be thin (equal to or less than 1 μm) in order that the coating produce the expected effect, that is render scarcely noticeable scratches caused by foreign bodies. In this the coating as described does not permit the obtaining of a true plating containing sufficient precious metal so that the article may bear a hallmark.

To overcome the difficulties mentioned in the above cited document, the European patent EP-B No. 0038294 (U.S. Pat. No. 4,403,014) suggests a simple procedure enabling the deposition of hard metallic coatings of which the composition varies progressively from the surface of the article towards the outer surface by means of a source subjected to a single procedure of evaporation or pulverization. Thus, in the course of the deposition, a simultaneous increase is effected in the concentration in volume of precious metal and a decrease in that of a metallic compound (e.g. TiN) these being deposited according to opposing gradients by means of a source including opposite gradients of concentration in volume of precious metal and of the metallic compound. Another method of practising the cited invention starts from separated sources formed respectively by the noble metal and the metallic compound, these sources being subjected to an evaporation procedure in accordance with respectively increasing and decreasing speeds.

The procedure which has just been described exhibits the difficulty of requiring the set up of a composite source, the thickness of which must be related to the thickness of the deposit to be effected, and so requires a delicate adjustment of the deposition apparatus which must be capable of controlling with great precision the variation in speed of the pulverization during the course of the procedure. On the other hand, this procedure leads by definition to deposits of which the volumetric percentage of gold and metallic compound is identical, this not permitting to obtain a deposit of gold of substantial fineness. Finally, it will be noted that this procedure is poorly adapted to the deposition of plating in thick layers since it is slow and burdensome.

The coatings which are objective of the two cited documents, although different in their composition, have a characteristic in common. They both possess a layer of precious metal, for example gold, deposited on underlying layers much harder than that of the precious metal, for example of titanium nitride. If the surface layer is scratched, it will be scratched in a shallow manner and the scratch will be very little apparent, and this less and less so as the underlying layer approaches a colour approximating that of the precious metal deposited at the surface.

The optical, electrical, mechanical and corrosion resistant properties of a film of gold comprising particles of silica ($SiO_2$) and deposited by a procedure of vapour deposition have been discussed in the review "Thin Solid Films" vol. 39 (1976), p. 165–174, Elsevier Sequoia, Lausanne, Taylor et al: "Properties Of Metal—Dielectric Codeposited Films". The article in question analyses above all the optical properties of such a layer, in particular the spectral reflectivity of pure gold as compared to that of a composite film of gold and of $SiO_2$. Very succinctly, the article mentions that the scratch resistance of the composite Au-$SiO_2$ is very good over the entire domain of the composition as examined, said resistance being better than that of a film of pure gold. This comment, purely qualitative, is however not complemented by any quantitative data. The article in question gives no teaching concerning the modifications of optical and mechanical properties due to a non-homogeneous structure (columnar growth at low density, for instance) which might appear for thicknesses of films on the order of 0.4 μm or more.

The Japanese patent document JP-A No. 59 185774 describes plating of a gold alloy deposited in the vapour phase and including furthermore hardening agents present in the form of nitrides. Thanks to this addition, the hardness and corrosion resistance of the plating are improved.

The Japanese patent document JP-A No. 60 114567 proposes the employment of a precious metal codeposited with a transparent oxide in order to form the coating on an article which then will exhibit a better resistance to wear and scratching. There has been proposed the employment of gold together with $SiO_2$ deposited by methods such as deposition under vacuum. The method may be applied to watch cases and enables reducing the gold content to a fifth of that of a conventional coating, while increasing the resistance to abrasion.

Finally, the Japanese patent document JP-A No. 60 67654 describes a coating formed of gold or of a gold alloy and of titanium nitride deposited onto an article by evaporation under vacuum for instance. Thus resistance to abrasion and scratching may be improved for objects such as watches or frames for glasses.

In the last four documents mentioned above, the emphasis has been placed on the thinness of the deposited layer from whence there results an economy of precious material, the principle concern being to provide a layer having above all wear resistance. No mention has been made of thick layers of precious metal intended to bear a jeweller's hallmark or likewise of thick layers to be coloured while retaining wear resistance.

SUMMARY OF THE INVENTION

Thus the principal objective of this invention is to provide a coating including a second layer of precious metal or alloy of said precious metal, such second layer being placed between the article and the first layer, said first layer being deposited according to the teaching of the state of the art as shown by the documents cited hereinabove.

DESCRIPTION OF THE PREFERRED EMBODIMENT

Figure 1:
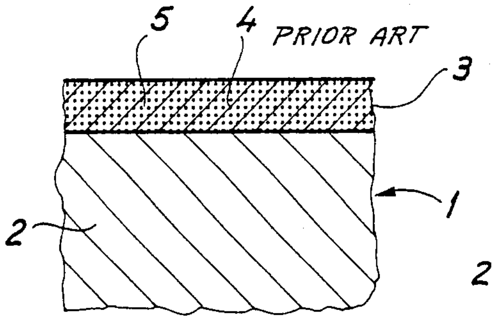
FIG. 1 is a cross-section through the article according to the prior art.

FIG. 1 is a partial cross-section of the article according to the prior art. The article 1 may be a watch case, a link forming a bracelet or any other article of jewellery. It comprises a case body or substrate 2 which may be formed of noble metal, common metal (stainless steel, brass) or plastic material. The substrate 2 is topped by a coating 3 referred to as the first layer. This first layer shown by the oblique hatching 4 is principally made up from a precious metal of the group including gold, silver, rhodium, palladium, platinum, iridium, osmium and ruthenium or of an alloy of said precious metals. This layer 3 includes furthermore discrete inclusions of a metallic compound formed by an oxide, a nitride, a carbide, a boride, a phosphide, a silicide or a fluoride indicated by dots 5.

The term "discrete" signifies that here we are concerned with inclusions, i.e. aggregates composed of a large number of molecules lacking chemical bonds with the precious metal. These inclusions are distributed in a substantially homogeneous manner throughout the entire thickness of the laeyr under consideration. This layer is obtained by vapour deposition, for instance by the methods CVD or PVD well known to the state of the art. These techniques are described in detail in the documents cited hereinabove and it is unnecesary to return to them here.

Nevertheless, special precautions will be required should one wish to obtain a deposit the aspect of which will be that of the precious metal or one of its alloys. Since the layer to be deposited is relatively thick, particular care should be taken to cool the article to be coated throughout the procedure. Thus there will be avoided columnar growths at low density which have been suggested hereinabove. The deposit is applied in a single operation, i.e. from a composite source or from two sources, one containing the metal, the other the metallic compound.

Thanks to the deposition in vapour phase, the fine inclusions of the metallic compound (on the order of 100 Å) are distributed in a very homogeneous manner throughout the layer. This would not be the case if this layer were galvanically deposited from a bath containing metallic compounds in the form of powders, the dimensions of which would be necessarily much greater (n the order of 1 $\mu$m). In this latter case, the distribution of the inclusions in the layer would be less homogeneous since the dimensions of these inclusions are on the same order as the thickness of the layer. There would result therefrom a lessening of the wear resistance.

Referring once again to the cross-section shown on FIG. 1 which represents the prior art, it will be seen that the coating comprises only a single first layer of precious metal and of inclusions of the metallic compound. Should one wish to produce only an imitation of plating, this layer would remain thin and its thickness will be between 0.5 and 1.5 $\mu$m for instance. In addition to the metallic compound, this layer will include precious metal in the pure state or in the alloy state.

In the case however where one wishes to place on the market a plated object entitled to bear hallmarkings, this layer will have to be much thicker in order to answer to various legislative requirements. To take an example of present legislation currently applicable in Switzerland, the plating must have a thickness of at least 8 $\mu$m and a fineness of at least 9 carats (C) in order to be entitled to bear a hallmark. Using a single first layer of the thickness of 8 $\mu$m containing a pure precious metal and deposited as indicated, one will be led to a very high fineness (more than 23 C) should one employ the coating discussed hereinabove containing 6% volume of TiN. To reduce the fineness and thereby the price of the article, one may of course increase the proportion of metallic compound. However, one would then risk a reflectivity no longer corresponding to the colour standard desired as will be discussed hereinafter in reference to FIG. 3.

To overcome this difficulty, there may be employed a precious metal alloy in place of the pure precious metal, an alloy which will have a fineness equal or greater to that required by the legislation. One could for example choose an alloy of gold at 14 C containing in particular 14 parts gold, $8\frac{1}{4}$ parts silver and $1\frac{3}{4}$ parts copper and include therein TiN or $SiO_2$, both alloy and metallic compounds being codeposited in the vapour phase.

Figure 2:
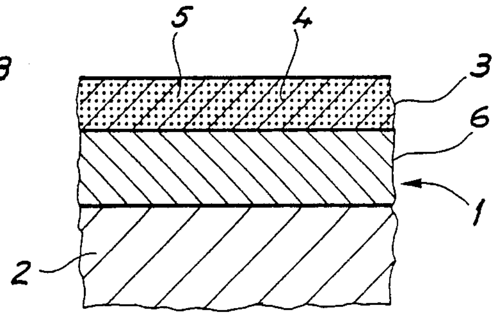
FIG. 2 is a cross-section through the article of the invention.

It remains nevertheless the case that a single layer deposited according to the prior art is very burdensome should one desire to obtain thick layers since vapour deposition is very slow and thus requires much time. There will thus now be described the object of the invention for which reference will be made to FIG. 2.

Directly applied onto substrate 2, there will be found a second layer 6 formed of a precious metal or alloy of said metal deposited for instance by electroplating.

Above the second layer 6 is a first layer 3 formed by a precious metal or alloy 4 thereof and inclusions of the metallic compound 5 as set forth in the description of FIG. 1. The second layer may be of pure precious metal should one desire a coating of high fineness or an alloy at 9, 14 or 18 C according to the fineness which is desired.

This second method has the advantage of being less expensive since the greatest part of the coating is deposited galvanically, this procedure being very commonly employed and well known to specialists.

Measures of spectral reflectivity and wear resistance have been carried out on plates covered with a coating according to the invention, the thickness of the first layer 3 of which was at least equal to 4000 Å (=0.4 μm).

Figure 3:
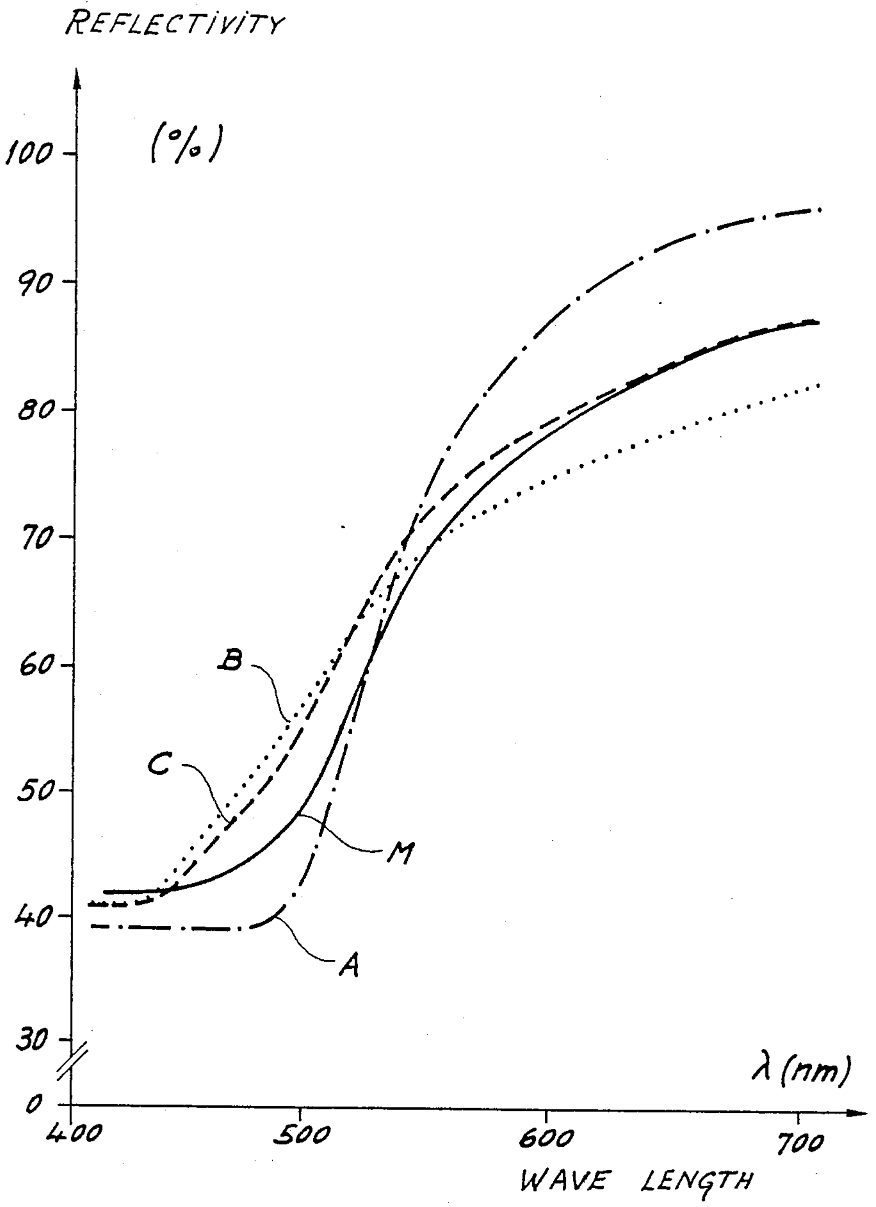
FIG. 3 is a diagram showing the measures of reflectivity on the articles obtained by the invention.

FIG. 3 takes note of the measures of spectral reflectivity found for the several samples by means of a spectrophotometer. There will be noted along the abscissa the wave length of the light in nm (nanometers) and along the ordinate the relationship of the reflected energy to the total incident energy as a percentage. Curve A represents fine gold (or pure gold), curves B and C are those of colour standards defined respectively by the symbols 1N14 and 2N18 of the standards of the Swiss watchmaking industry (NIHS) and curve M is that of gold having inclusions in accordance with the invention. Curve M is obtained with inclusions of titanium nitride (TiN) in fine gold, these inclusions representing in volume 5 to 7% of the total volume occupied by the first layer. This curve shows that the reflectivity of the first layer is close to that of the standard colours of layers currently employed in the watchmaking industry (curves B and C) and which are generally obtained by galvanic methods. The layer studied here is naturally only one example and it is clear that by varying the percentage of inclusions and/or by replacing the TiN by another metallic compound, one may obtain very different reflectivities and when starting off from tints belonging to other standards than those considered hereinabove.

A particularly interesting variety is that for which the quantity of inclusions is such that the reflectivity of the first layer is substantially the same as the reflectivity of the metal in the pure state. It has been determined for instance that inclusions of silica ($SiO_2$) of at least 10% in volume in fine gold leads to a reflectivity curve which is almost entirely identical to that of fine gold.

Figure 4:
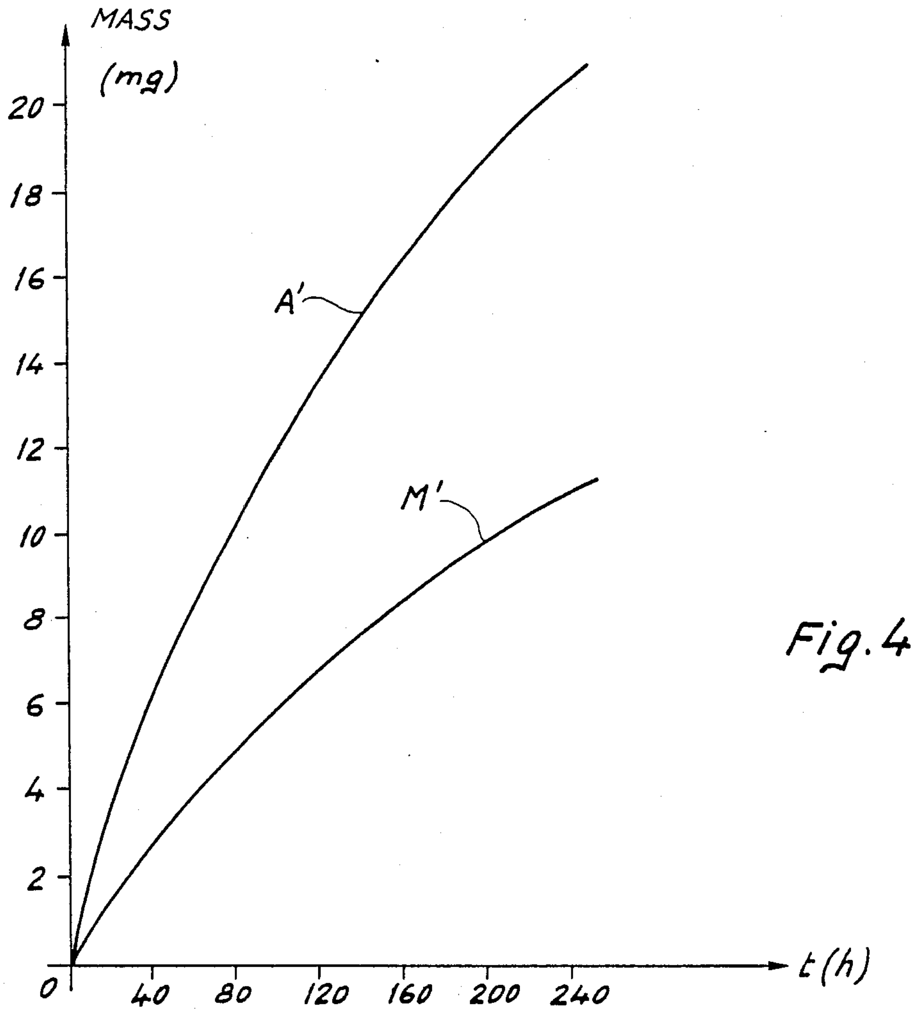
FIG. 4 is a diagram showing comparative measures of wear resistance of articles coated according to the invention with articles not so coated.

FIG. 4 is a diagram illustrating the wear resistance of articles coated in accordance with the invention relative to the wear resistance of a galvanically coated article. In this example one is concerned with the coating of gold with inclusions of 6% in volume of TiN. Along the abscissa is shown the time in hours during which the samples are submitted to a wear test and along the ordinate the quantity of material removed in milligrams (mg). The samples to be tested are placed into a machine which polishes by means of sliding ceramic blocks, water and a wetting agent. The abrasive mass and the samples oscillate in several directions and undergo a pulsed smoothing pressure. One determines the loss of mass of the samples as a function of the time of treatment. Such a polishing machine has been described in communication Nr. 18 entitled "L'usure des boîtiers de montre en plaqué or galvanique" of the 57th Congress of the Société Suisse de Chronométrie, Montreux, 22nd and 23rd Oct. 1982.

The method which has just been described operates through smoothing or rubbing the surface to be examined. It is distinguished in this respect from a simple measure of hardness by means of the microhardness tester, since it has been noted that it is not always valid to attempt to correlate a hardness measure with a determination of the wear resistance. In the case of the present invention, the coating does not exhibit a substantially increased hardness in the sense that this is usually understood, but rather an excellent wear resistance if the latter is measured while simulating the wear phenomenon such as is produced naturally.

On FIG. 4 curve A' represents the loss of mass of a sample covered with fine gold galvanically deposited and curve M' the loss of mass of a sample covered with the coating according to the invention, the losses of mass being measured according to the method indicated hereinabove under identical conditions. It is noticed that the loss of mass, thus the wear, is approximately half as great for the sample covered in accordance with the invention, this characteristic remaining substantially constant over the time that the trial lasted. In the work entitled "L'habillement de la montre" by J. P. Renaud, LSRH, Neuchâtel 3 and 17 June 1975, it has been shown that the diminution of thickness of a layer of galvanically deposited gold alloy at 18 C fineness, is on the order of 2 μm per year for a watch case being worn. This diminution will be no more than 1 μm for the same period if the watch case is coated with the layer defined by the invention, this representing a noteworthy improvement.

Decorative coatings include generally a finishing phase called colouring. This important operation generally consists of depositing a layer of gold of thickness ranging between 0.5 and 1.5 μm of a fineness of 23.5 C. It aims mainly at two goals: initially, that of determining the final colour (aspect) of the plating since the underlying plating composed of gold, silver, copper, or cadmium may exhibit extremely varied colours according to the conditions of deposition (different deposition speed for the metals forming the alloy); and next, that of preventing changes of the colour of the underlying plating (tarnishment) which could be produced over a period of time, such changes being more noted as the fineness diminishes.

In the coating according to the invention, the galvanic colouring phase is replaced by a phase having the same purposes but using instead a vapour deposition phase. In this case, however, as has been shown hereinabove, the wear resistance will be at least doubled, this leading to a higher quality of plating and better reliability and this thanks to the inclusions of the metallic compounds deposited at the same time as the precious metal.

To return to what has been said relative to the Swiss legislation on the commercial control of precious metals, the coating deposited according to the invention must have a total thickness of at least 8 μm and a fineness of at least 9 C. This coating could comprise a second layer of an alloy of gold of a thickness equal or greater than 7 μm on which second layer is deposited a first layer of a thickness attaining at least 1 μm obtained in vapour phase and containing gold and inclusions of titanium nitride occupying a volume comprised between 5% and 7% of the total volume occupied by the said first layer.

It is evident that other thicknesses and/or other proportions could be chosen whilst remaining within the domain of application of the present invention. One for example could adopt the criteria obtaining from the recommendations of the International Standards Organization (ISO).

The coating according to the invention thus presents a corrosion resistance which is comparable to that of precious metal without inclusions. For this, trials have been conducted according to known methods as for instance exposure to saline fog and periodic soaking in artificial sea water, or artificial sweat.

What we claim is:

1. An article topped by a wear resistant coating comprising a precious metal from the group including gold, silver, rhodium, palladium, platinum, iridium, osmium and ruthenium or any alloy of the foregoing, said coating being made up of a first layer of said precious metal or alloy thereof, and a second layer of said precious metal or alloy thereof, said second layer being electrodeposited on said article, said first layer comprising discrete inclusions of a metallic compound formed by an oxide, a nitride, a carbide, a boride, a phosphide, a silicide or a fluoride, said inclusions being distributed in a substantially homogeneous manner thorugh the entire thickness of the first layer, said first layer being applied over said second layer by vapour deposition (CVD) or PVD), its thickness being equal to or greater than 0.4 um, the total thickness of the coating and its precious metal content being such that said article is entitled to bear hallmarking.

2. An article as set forth in claim 1 in which the quantity of the inclusions in the first layer is such that its spectral reflectivity is substantially the same as the spectral reflectivity of the precious metal or one of its alloys.

3. An article as set forth in claim 1 wherein the total thickness of the coating is equal to or greater than 8 μm, the second layer being a gold alloy of at least 9 carats fineness and the first layer comprising gold and titanium nitride inclusions.

4. An article as set forth in claim 3 wherein the thickness of the second layer is equal to or less than 7 μm, the thickness of the first layer being equal to or greater than 1 μm and the titanium nitride inclusions occupying a volume between 5% and 7% of the total volume of said first layer.

* * * * *